March 17, 1925.　　　　　　　　　　　　　　　1,529,722
J. R. SENSIBAR
METHOD OF EXCAVATING AND FILLING
Filed Sept. 22, 1920　　　2 Sheets-Sheet 1
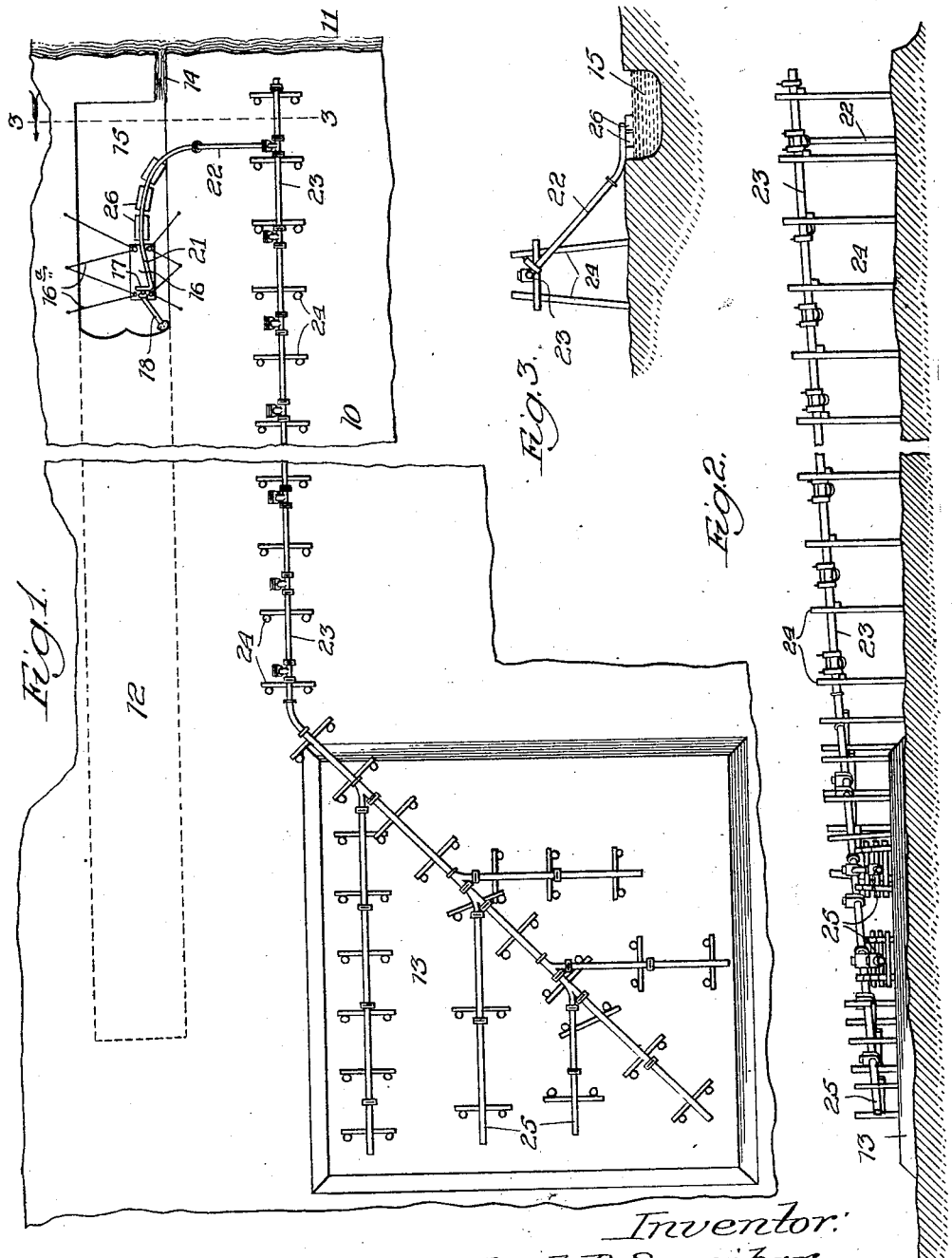

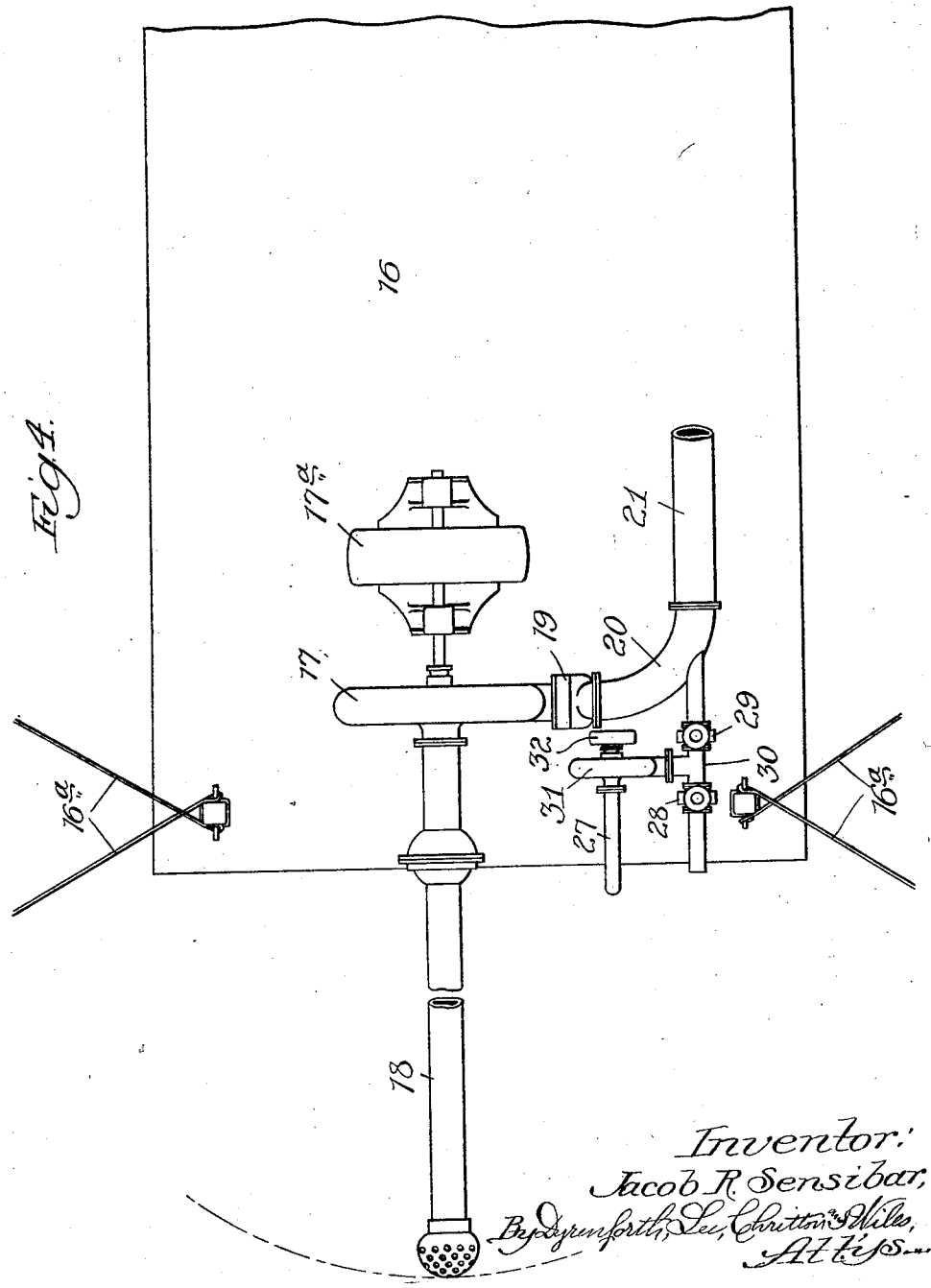

Patented Mar. 17, 1925.

1,529,722

UNITED STATES PATENT OFFICE.

JACOB R. SENSIBAR, OF CHICAGO, ILLINOIS.

METHOD OF EXCAVATING AND FILLING.

Application filed September 22, 1920. Serial No. 412,030.

*To all whom it may concern:*

Be it known that I, JACOB R. SENSIBAR, a citizen of the United States, residing at 133 W. Washington Street, Chicago, in the county of Cook and State of Illinois, have invented a new and useful Improvement in Methods of Excavating and Filling, of which the following is a specification.

This application relates to the method of excavating and filling, and is fully described in the following specification and shown in the accompanying drawing in which:

Fig. 1 is a diagrammatic plan view of a pumping plant embodying my invention;

Fig. 2 is a side elevation of the same;

Fig. 3 is a cross sectional view on the line 3, 3 of Fig. 1 and,

Fig. 4 is an enlarged plan view of the scow showing the pumps and connections.

The following operations are described as being carried on in a large low level area 10 preferably near a body of water 11. It is desired to take earth from the area 12 indicated by dotted lines and deposit it in the rectangular area 13 so as to make a fill. At the same time the excavated area 12 becomes a lake or reservoir, which is preferably kept filled during the excavating operation by a channel 14 by which it is connected to the body of water 11. The fill 13 may be carried to a single level or to a series of levels as desired, each level being controlled preferably by the means described in my Patent No. 1,392,663, granted October 4, 1921.

A small lake 15 is formed near the end of the area 12 and water is brought thereto in any suitable way as thru the channel 14. A scow 16 is placed in this lake and is anchored by guy-ropes 16ª. It carries a centrifugal sand pump driven by any suitable means such as a motor 17ª. The pump has a submerged intake pipe 18 which is preferably mounted in a well known manner so as to swing thru either a vertical or a horizontal arc and has mechanism (not shown) whereby it may be raised and lowered or swung sidewise at will.

The sand pump 17 delivers thru a check valve 19 and a T 20 the pipe 21 and thence thru the riser 22 to the highest point in the pipe line 23. This pipe line is carried on a suitable framework 24 and has a gradually increasing slope or "fall" from its highest point to the discharge ends 25 as shown in Fig. 2.

The pipe 21 is carried on pontoons 26 and is provided at this point with flexible joints so as to permit the pipe to adapt itself to various positions of the scow.

A discharge pipe 27 is connected to the T 20 thru the valves 28 and 29 and the T 30. A relatively small jet pump 31 driven by a motor 32 is connected to the T 30 between the valves 28 and 29. When the sand pump 17 is in operation the valve 28 is normally open and the valve 29 is closed.

With the intake 18 near the bottom, the water delivered by the sand pump 17 contains a very high percentage of soil, sand and gravel which will settle to the bottom of the pipes if allowed to slow up even for a brief period. It is necessary to keep the water moving at a speed about thirteen feet per second in order to hold this sediment in suspension. In operation however it frequently becomes necessary to stop the pump. When this happens, the water in the pipe 22 will keep moving at a rate which will insure the sediment being carried out. To assist in clearing the pipes 21, 23, the intake 18 is raised from the bottom of the lake 15 so as to pump only clear water.

As the sand pump 17 is stopped, the valve 29 is opened, thereby permitting any sand in the pipe 21 to be discharged thru the pipe 27, clearing the pipe 21 and discharging the sand near the end of the intake pipe 18, where it may be sucked up later.

When however a plug of sand does occur in the line as indicated by pressure in the pipe suddenly rising above normal, the sand pump is stopped, the valve 29 opened and the water and sand in the pipes 21 and 22 discharged as previously described. The valve 28 is then closed and the jet pump 31 started. It delivers clear water at a very much higher pressure but in smaller quantity than the sand pump 17. This clear water will slowly open a passage thru the sand plug which will rapidly be worn away. When such a plug occurs, the sand settles to the bottom and accumulates at one or more points in the pipe line until the pipe is nearly closed. The sand at the top of the pipe however is less densely packed than at the bottom and the water pressure slowly builds up from the small high pressure jet pump 31 until it passes over the top of the plug. As soon as a flow is started over the plug it cuts rapidly until an opening near the top of the pipe is made large enough to carry the volume of water delivered by the jet pump. As soon as the pressure near the pump falls to nearly normal, the operator knows that the sand plug is partly removed and starts the sand pump on clear water until the gauge shows that the plug is entirely removed.

The process of excavation is begun as stated in a small lake 15, which is gradually extended toward the left in Fig. 1 until it covers the predetermined area 12, while all of the soil removed is deposited in the area 13. The lake 15 is kept full of water by the channel 14 and the water pumped into the area 13 may also be drained back into the lake 15.

While I have shown and described but a single embodiment of my invention, it is to be understood that it is capable of many more modifications. Changes, therefore, in the construction and arrangement may be made which do not depart from the scope of the appended claims in which it is my intention to claim all novelty inherent in my invention as broadly as possible in view of the prior art.

What I claim as new and desire to secure by Letters Patent is:

1. The method of excavating and filling comprising undermining the material to be excavated, mixing it with water, pumping to the highest point of a high level pipe line, distributing by gravity with an increasing fall in the pipe line from said highest point, moving the pump as the material is excavated and tapping into said pipe line at a new point which will then be the highest point in the line.

2. In combination, a sand pump adapted to pump a mixture of sand and water thru a long high level pipe line, a delivery line leading from the sand pump to said high level pipe line, a check valve in the delivery line, and a valve controlled discharge pipe beyond the check valve and near the pump which may be opened for clearing the delivery line when the sand pump is stopped.

3. In combination, a sand pump adapted to pump a mixture of sand and water thru a long high level pipe line, a delivery line leading from the sand pump to said high level pipe line, a check valve in the delivery line, and a valve controlled discharge pipe beyond the check valve and near the pump which may be opened for clearing the delivery line when the sand pump is stopped, the discharge pipe emptying near the intake of the sand pump.

4. In combination, a sand pump adapted to pump a mixture of sand and water thru a long high level pipe line, a delivery line leading from the sand pump to said high level pipe line, a check valve in the delivery line, a valve controlled discharge pipe beyond the check valve and near the pump which may be opened for clearing the delivery line when the sand pump is stopped, and a jet pump connected to said delivery line, capable of pumping against a higher pressure than the sand pump and adapted to pump a stream of clear water at high pressure thru the high level pipe line to clear it of sand plugs when such form therein.

5. In combination, a sand pump adapted to pump a mixture of sand and water thru a relatively long pipe line, a delivery line leading from the sand pump to said high level pipe line, a check valve in the delivery line, a valve controlled discharge pipe beyond the check valve and near the pump which may be opened for clearing the delivery line when the sand pump is stopped, and a jet pump connected to said delivery line, capable of pumping against a higher pressure than the sand pump and adapted to pump a stream of clear water at high pressure thru the long pipe line to clear it of sand plugs when such form therein.

JACOB R. SENSIBAR.